(12) United States Patent
Weese

(10) Patent No.: US 7,753,045 B1
(45) Date of Patent: Jul. 13, 2010

(54) QUICK START COOKING GRATE

(76) Inventor: Curtis Jay Weese, 613 Cedar Dr. N., Hudson, WI (US) 54016

( * ) Notice: Subject to any disclaimer, the term of this patent is extended or adjusted under 35 U.S.C. 154(b) by 52 days.

(21) Appl. No.: 12/220,058

(22) Filed: Jul. 21, 2008

Related U.S. Application Data

(60) Provisional application No. 60/961,765, filed on Jul. 24, 2007.

(51) Int. Cl.
*A47J 37/07* (2006.01)
*F24B 1/20* (2006.01)
*F24C 1/16* (2006.01)

(52) U.S. Cl. .................. 126/9 R; 126/25 B; 126/152 R

(58) Field of Classification Search .................. 126/9 B, 126/25 B, 25 R, 152 R, 9 R
See application file for complete search history.

(56) References Cited

U.S. PATENT DOCUMENTS

| | | | | | |
|---|---|---|---|---|---|
| 2,625,148 | A | * | 1/1953 | Snyder | 126/25 B |
| 2,812,098 | A | * | 11/1957 | Escaut | 220/489 |
| 3,384,066 | A | * | 5/1968 | Tufts | 126/9 R |
| 3,717,137 | A | * | 2/1973 | Moline et al. | 126/25 B |
| 4,133,335 | A | * | 1/1979 | Malafouris | 126/9 R |
| 4,296,726 | A | * | 10/1981 | Ross et al. | 126/25 B |
| 4,334,516 | A | * | 6/1982 | Dittmer et al. | 126/9 R |
| 4,953,452 | A | * | 9/1990 | Tarlow | 99/344 |
| 5,103,799 | A | * | 4/1992 | Atanasio | 126/9 R |
| 5,638,807 | A | * | 6/1997 | Flamenbaum | 126/25 B |
| 6,591,828 | B1 | * | 7/2003 | Schneider | 126/9 R |
| 6,631,711 | B2 | * | 10/2003 | Patience | 126/25 B |
| 6,827,076 | B2 | * | 12/2004 | Crawford et al. | 126/25 R |
| 6,892,895 | B2 | * | 5/2005 | Zhu et al. | 220/489 |
| 7,237,548 | B2 | * | 7/2007 | Mizrahi et al. | 126/9 R |
| 2006/0236995 | A1 | * | 10/2006 | Chang | 126/25 R |
| 2007/0006863 | A1 | * | 1/2007 | Barbarich | 126/9 R |

* cited by examiner

*Primary Examiner*—Kenneth B Rinehart
*Assistant Examiner*—Frances Kamps
(74) *Attorney, Agent, or Firm*—Skinner and Associates

(57) ABSTRACT

A charcoal cooking grate which is hinged to fold up to trap charcoal in a tight pile that is necessary for efficient burning. The grate folds completely over the top and lays flat to allow for three sheets of crumpled up newspaper to be placed under one side. Both sides then fold up to trap the charcoal in the middle of the grate. There are also two hinged sides which fold up to trap the charcoal. These hinged sides wrap around the grate to complete the enclosure. The charcoal can then be loaded onto the center of the cooking grate. Because you have a defined area to pour the charcoal, you get the exact amount of charcoal that is needed to use the grill. After the coals have become hot enough to cook with, then the chains can simply be pulled to release the hinged sides and the end grates to their original positions. The charcoal is automatically dispersed across the charcoal grate as the end grates are lowered back down to a flat position. The side flaps then lay out the way against the side of the grill to allow for cooking. The aspects, features, advantages, benefits and objects of the invention will become clear to those skilled in the art by reference to the following description, claims and drawings.

1 Claim, 11 Drawing Sheets

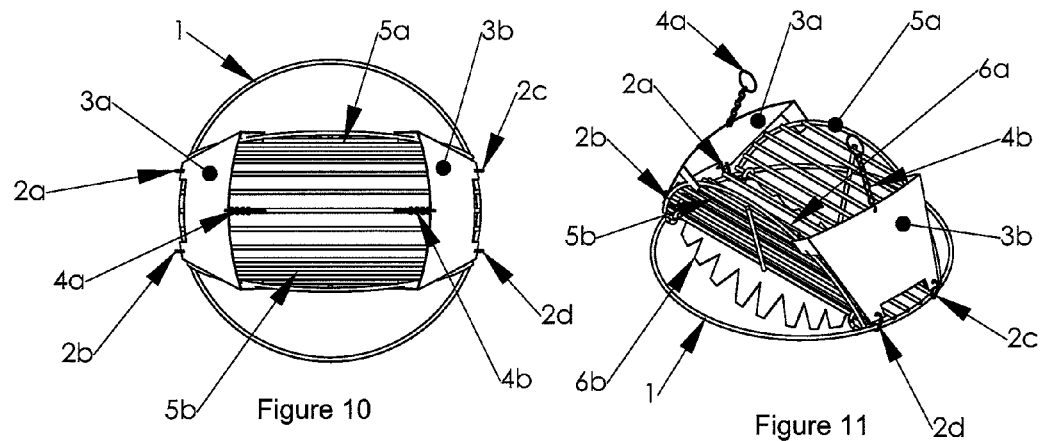
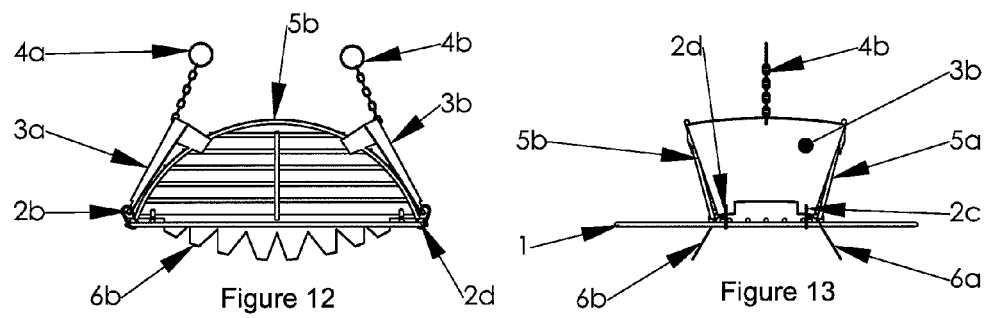
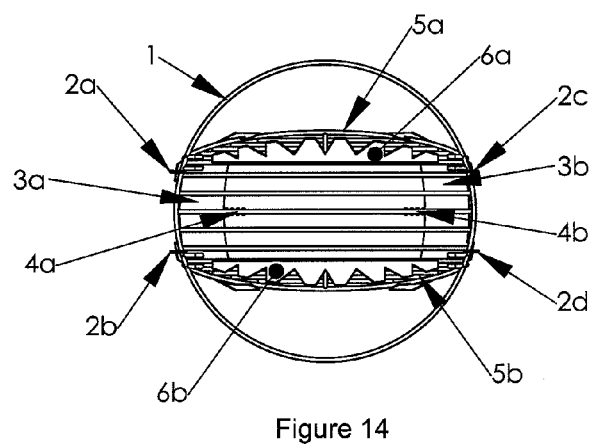

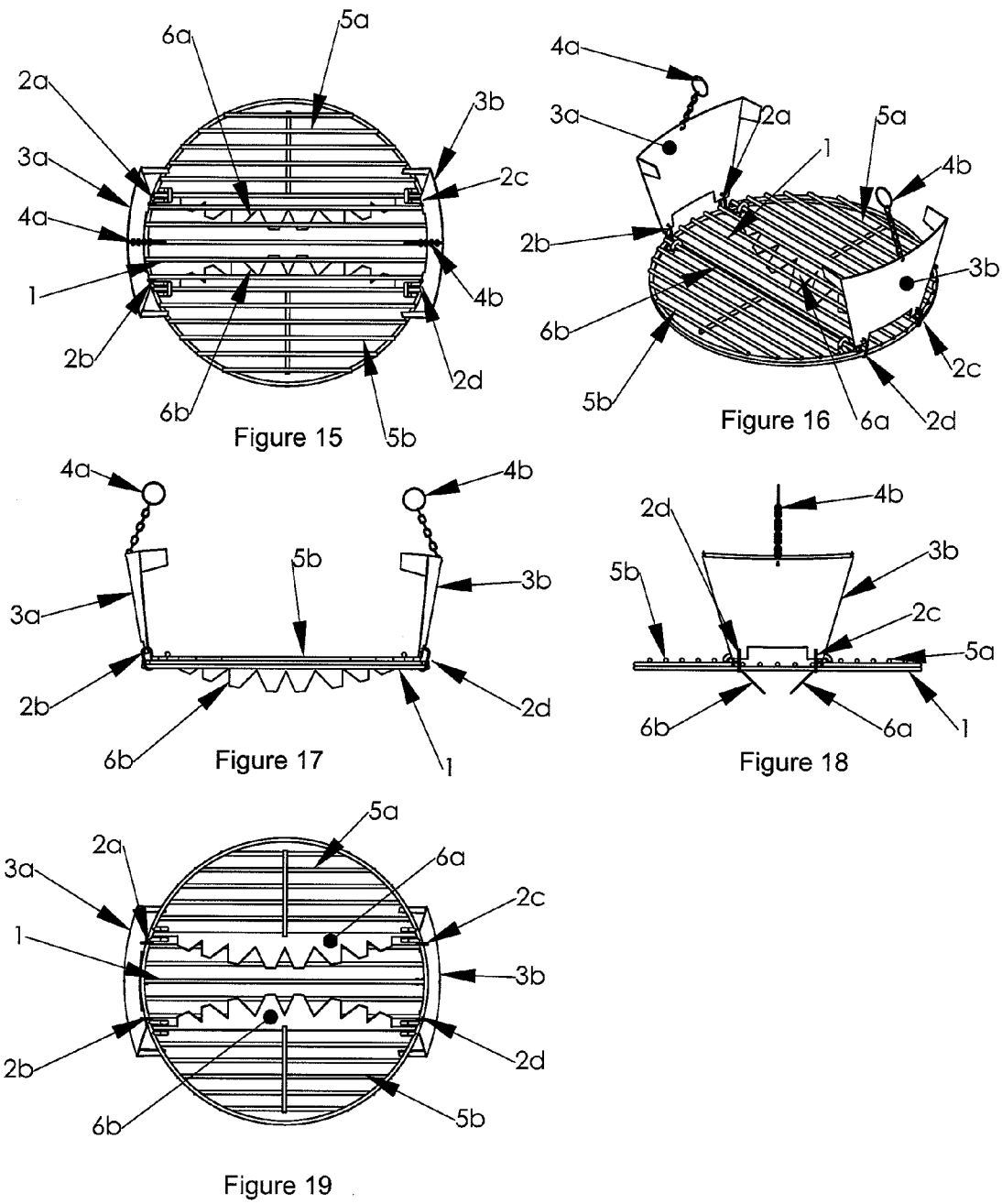

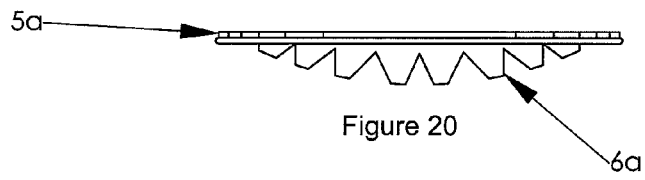
Figure 20
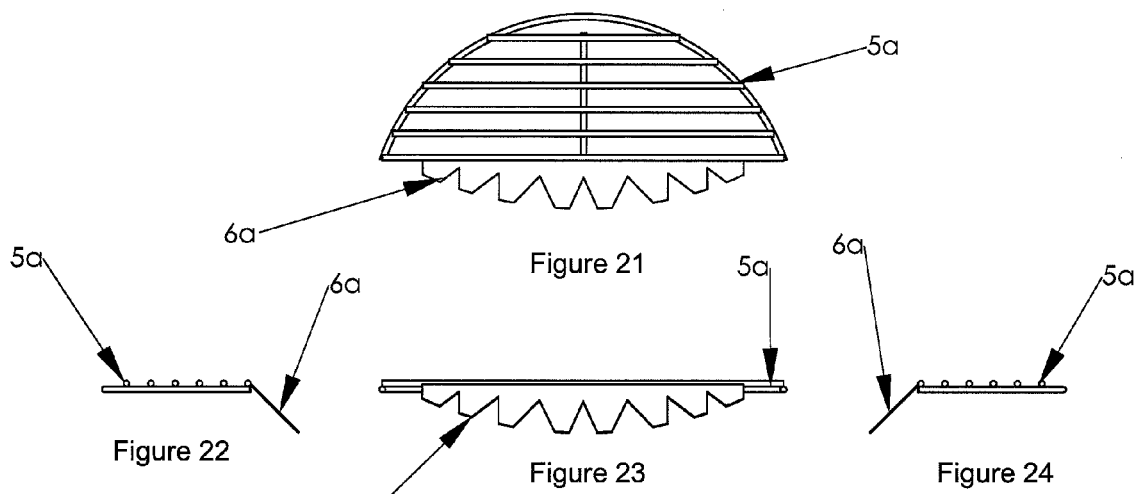
Figure 21
Figure 22
Figure 23
Figure 24
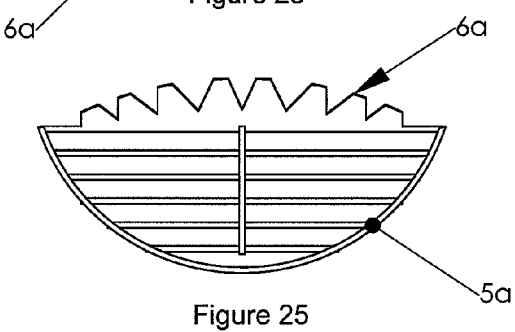
Figure 25
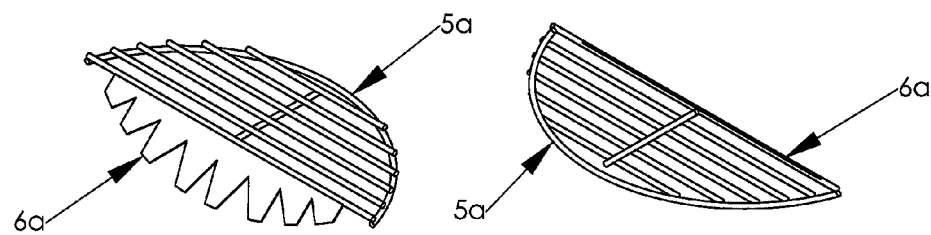
Figure 26
Figure 27

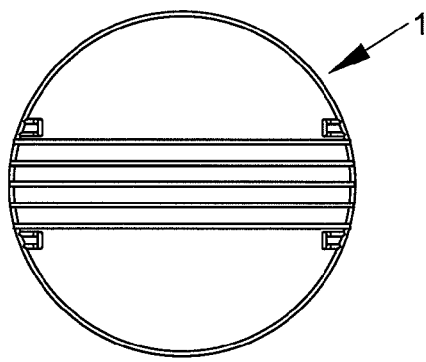
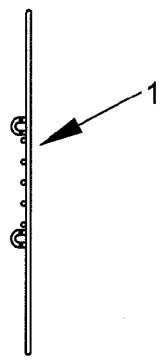
Figure 28
Figure 29
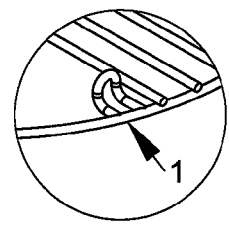
Figure 30
Figure 31
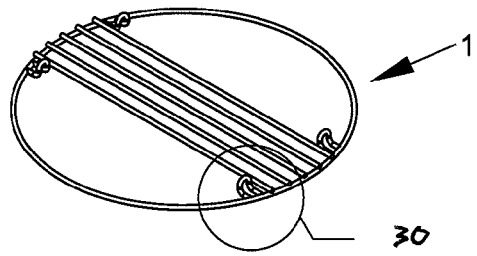
Figure 32
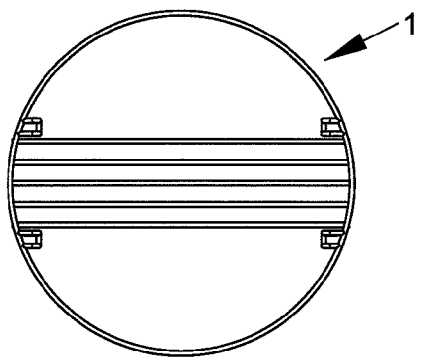
Figure 33
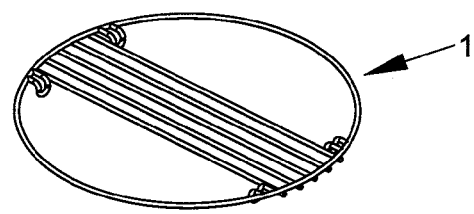
Figure 34

QUICK START COOKING GRATE

CROSS-REFERENCE TO RELATED APPLICATIONS, IF ANY

I hereby claim priority to my earlier file provisional application No. 60/961,765 dated Jul. 24, 2007.

37 C.F.R. 1.71(e) AUTHORIZATION

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The field of invention is charcoal grills. The present invention relates, generally, to charcoal grills. Particularly, the invention relates to making it easier to start a charcoal fire without the use of charcoal lighter fluid, or the use of any external starting devices that are not part of the charcoal grill. In a preferred embodiment this technology is part of the grill.

2. Background Information

Charcoal is hard to light. It must first be meticulously stacked by hand on the charcoal grate and doused with lighter fluid. The lighter fluid must then sit for several minutes to soak in to the charcoal before the charcoal can light. After the coals are hot enough to cook, then they must be spread around the charcoal grate to create an even layer of heat. There are several problems with the current method being used. First of all there is the added hassle and cost of using lighter fluid. Secondly there is a lot of time spent stacking the coals and then redistributing them back around the grate when they are hot enough to cook. Thirdly when lighter fluid is used it can be tasted in the food. Fourthly, it is hard to measure the amount of charcoal that you need when stacking it by hand on the charcoal grate. There are several charcoal starters on the market today that don't require the use of lighter fluid, but they are not a part of the grill and still require the redistributing of the coals after they are hot enough to cook with.

This technology is believed to have significant limitations and shortcomings, including but not limited to:
a. The added hassle and cost of lighter fluid.
b. The additional time spent stacking and redistributing coals after they are hot enough to cook with.
c. The lingering taste of lighter fluid in the cooked food.
d. The inability to adequately measure the necessary amount of charcoal needed to cook the food.
e. The problem that any starting mechanisms currently on the market are not an actual part of the grill unit.

For this and other reasons, a need exists for the present invention.

All U.S. patents and patent applications, and all other published documents mentioned anywhere in this application are incorporated by reference in their entirety.

BRIEF SUMMARY OF THE INVENTION

The invention provides a charcoal cooking grate apparatus/method which is practical, reliable, accurate and efficient, and which is believed to fulfill the need and constitute an improvement over the background technology.

In one embodiment of the invention, the apparatus/method includes a redesigned charcoal cooking grate which is hinged to fold up to trap charcoal in a tight pile that is necessary for efficient burning. The Flip Up End Grate folds completely over the top and lays flat to allow for three sheets of crumpled up newspaper to be loaded under one side. Both Flip Up End Grates then fold up to trap the charcoal in the middle of the Charcoal Grate Base. There are two Side Capture Flanges which also fold up to trap the charcoal. The Side Capture Flanges wrap around the Flip Up End Grates to enclose the charcoal completely. The charcoal can then be loaded onto the center of the Charcoal Grate Base. Because you have a defined area to pour the charcoal, you get the exact right amount of charcoal that is needed to use the grill. After the coals have become hot enough to cook with, then you simply pull on the Pull Chains and the Side Capture Flanges release and lay against the side of the grill and out of the way during the cooking process. The Flip Up End Grates return to a horizontal position and align with the middle portion of the Charcoal Grate Base. The coals are automatically spread out for grilling purposes. The Pull Chains can lay over the top cooking grate brackets and out of the way during cooking. The aspects, features, advantages, benefits and objects of the invention will become clear to those skilled in the art by reference to the following description, claims, and drawings.

BRIEF DESCRIPTION OF THE OPERATIONAL SEQUENCE DRAWINGS

FIGS. 10-14 are top, isometric, front, right and bottom views, respectively, of the grill in charcoal lighting position.

FIGS. 15-19 are top, isometric, front, right and bottom views, respectively, of the grill in position once charcoal is ready for cooking.

FIGS. 20-27 are rear, top, left, front, right, bottom, top isometric and bottom isometric views, respectively, of the flip up end grate.

FIGS. 28-34 are top, right, detail, front, top isometric, bottom and bottom isometric views, respectively, of the charcoal grate base.

DETAILED DESCRIPTION

Figure 1:
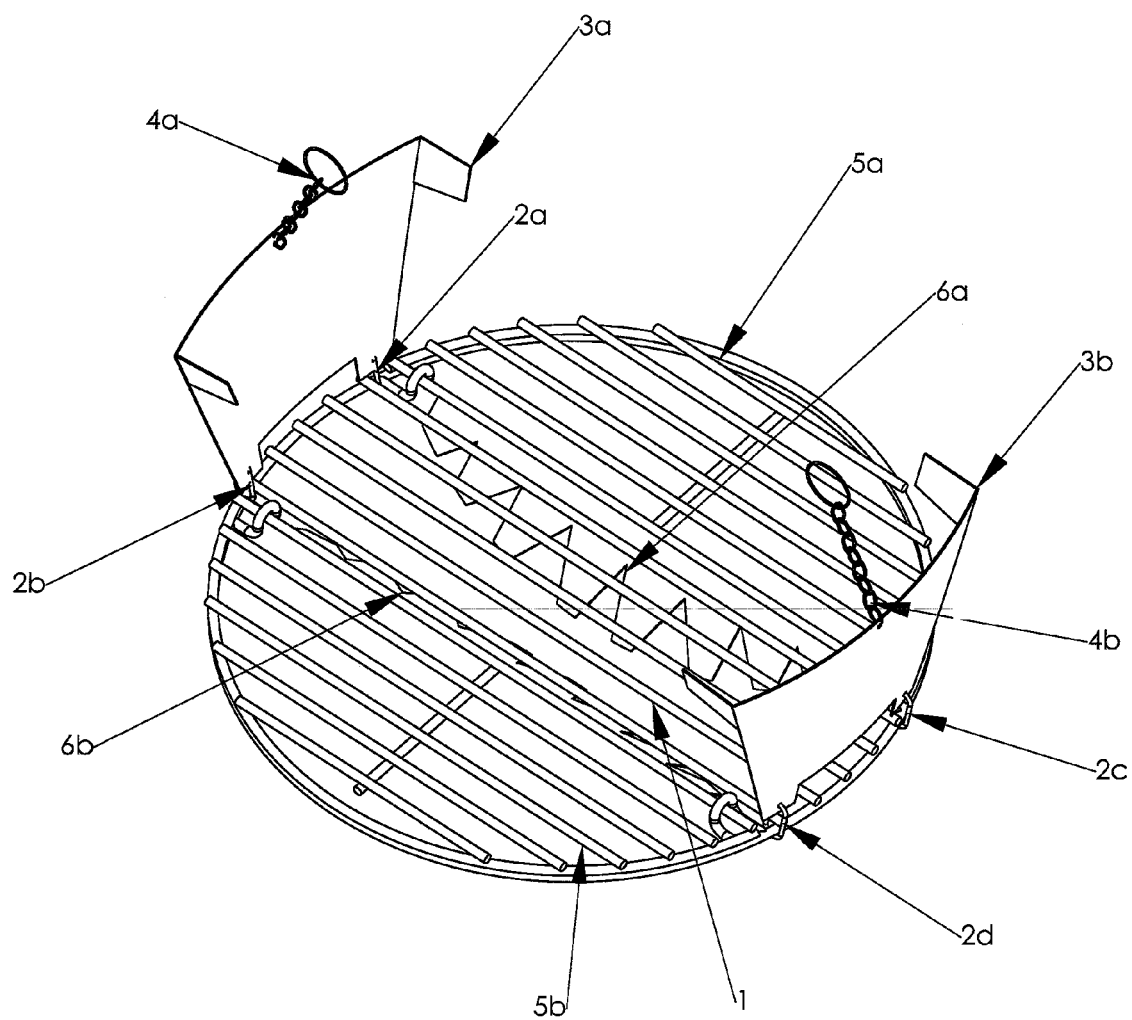
FIG. 1 is a perspective view of an embodiment of the Quick-Start Cooking Grate showing how it looks when not in use.
Figure 2:
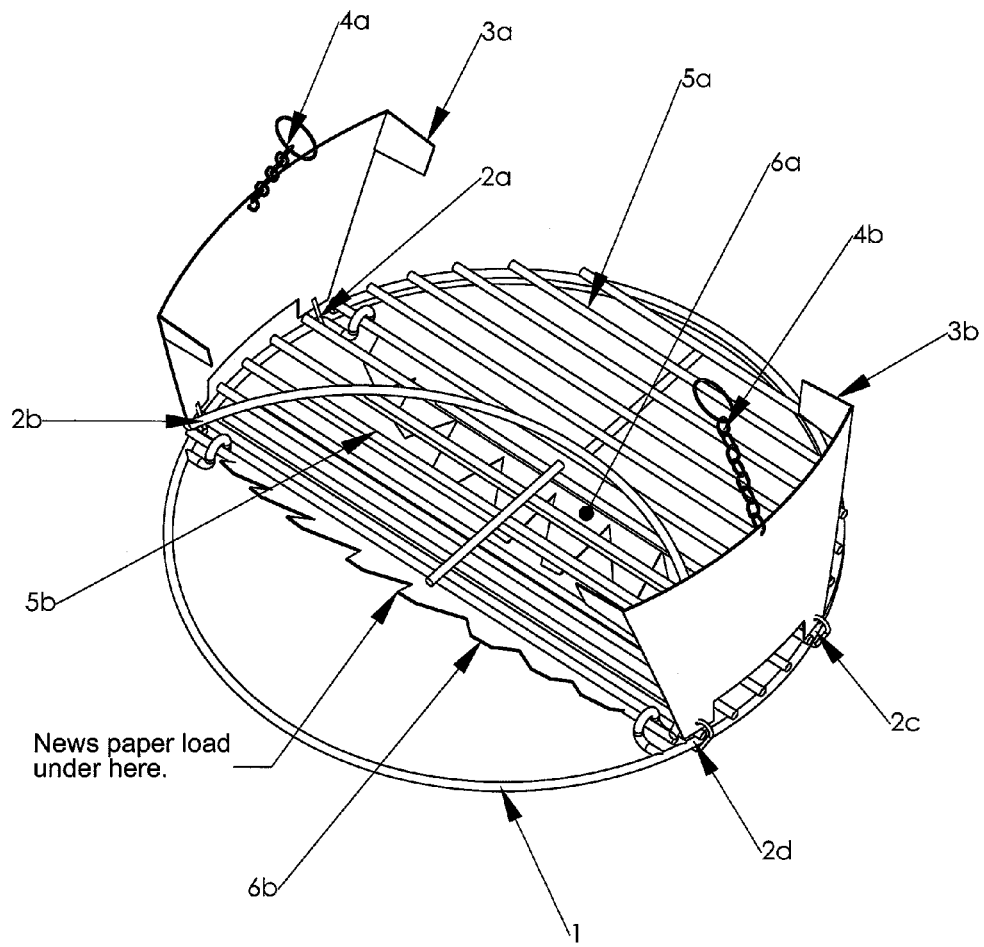
FIG. 2 is a perspective view of an embodiment of the Quick-Start Cooking Grate showing how it looks when the user is preparing to light the charcoal.
Figure 3:
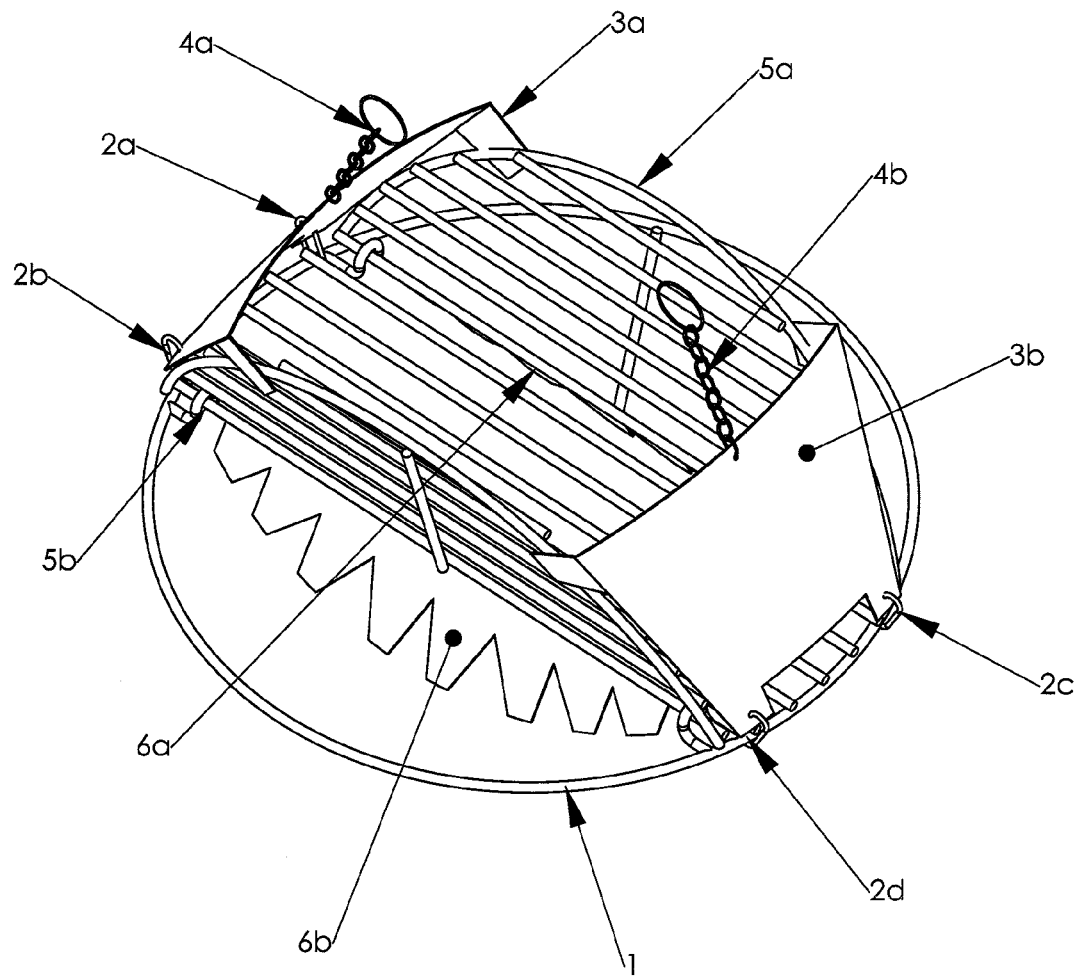
FIG. 3 is a perspective view of an embodiment of the Quick-Start Cooking Grate showing how it looks when the charcoal is loaded and ready for lighting.
Figure 4:
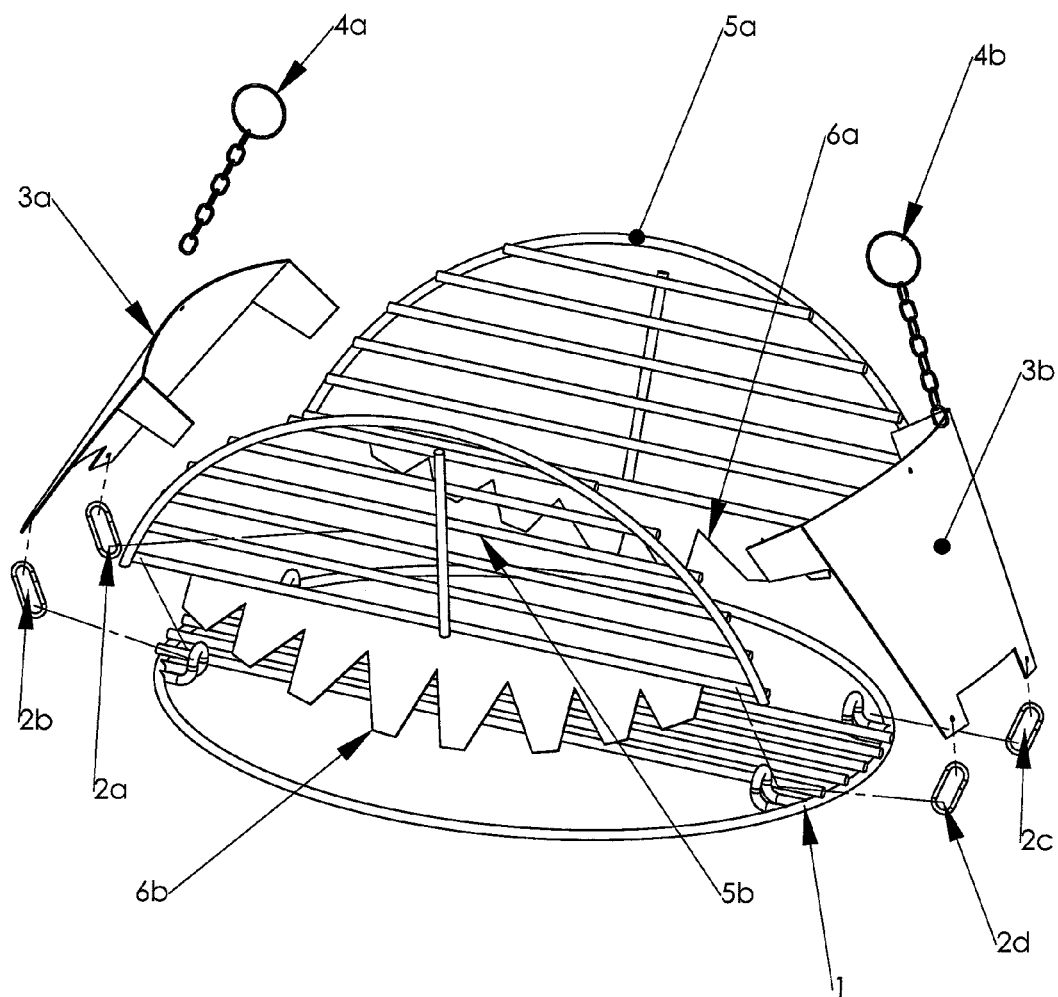
FIG. 4 is a perspective view of an embodiment of the Quick-Start Cooking Grate showing how it looks when all of the parts are separated out.
Figure 5:
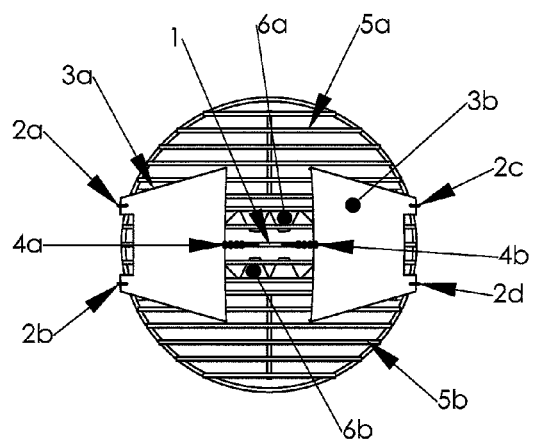
FIGS. 5-9 are top, isometric, front, right and bottom views, respectively, of the grill folded down when not in use.
Figure 6:
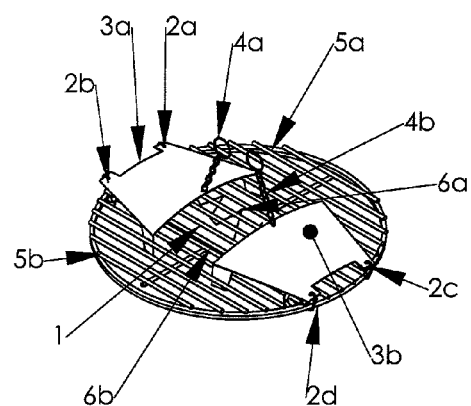
Figure 7:
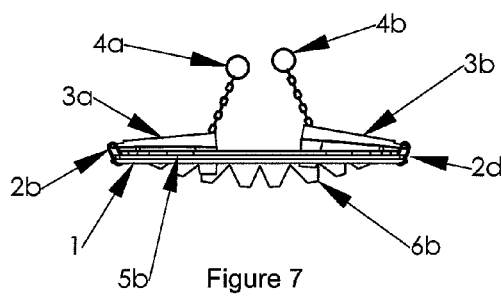
Figure 8:
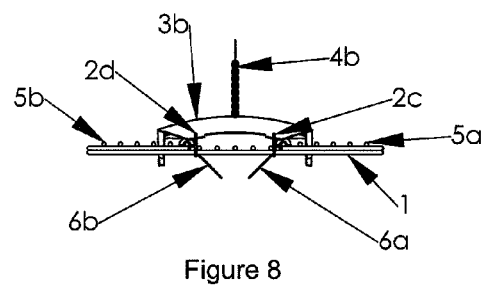
Figure 9:
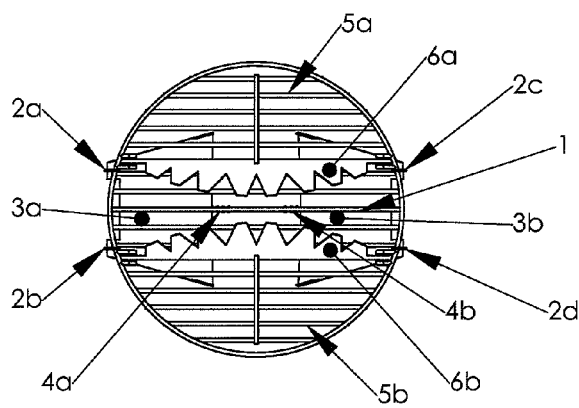
Figure 35:
FIGS. 35-39 are top, front, right, front isometric and rear isometric views, respectively, of the side capture flange.
Figure 36:
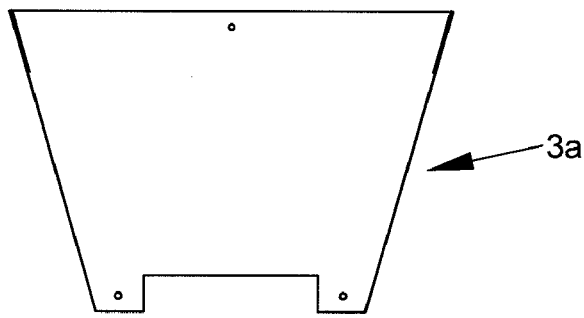
Figure 37:
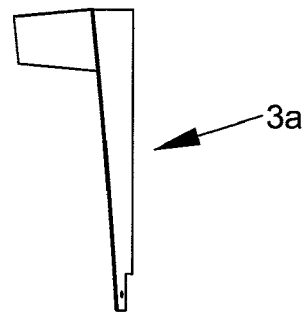
Figure 38:
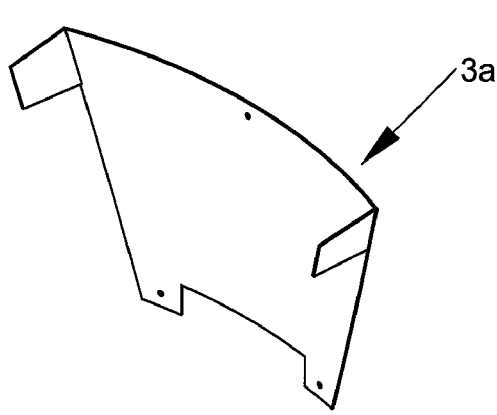
Figure 39:
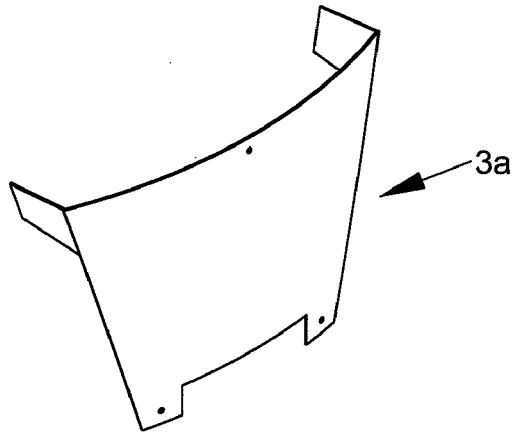
Figure 40:
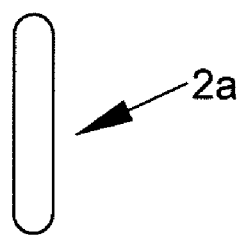
FIGS. 40-43 are top, isometric, side and front views, respectively, of the coupling.
Figure 41:
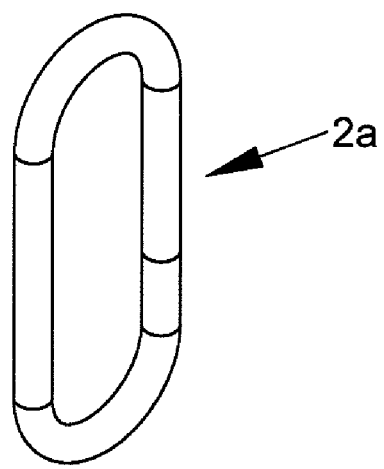
Figure 42:
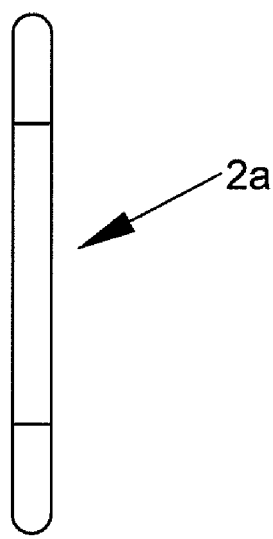
Figure 43:
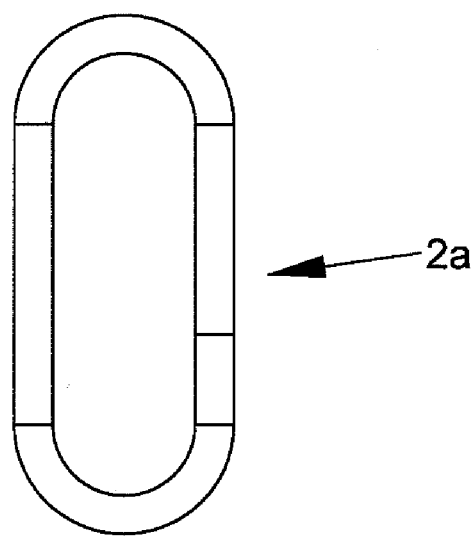

Referring to FIGS. 1-4, an embodiment of the invention is illustrated. The basic structure of the apparatus of the invention is comprised of one Charcoal Grate Base (1), four Couplings (2a, 2b, 2c, 2d), two Flip Up End Grates (5a, 5b), two Side Capture Flanges (3a, 3b), two Underside Flaps (6a, 6b) and two Pull Chains (4a, 4b).

The elements are interconnected as follows. The basic function or behavior of the apparatus is as follows: The Underside Flaps (6a, 6b) are positioned under the Charcoal Grate (1) and hold the newspaper in place during the burning process to create a better concentration of heat. The Flip Up End Grates (5a,5b) fold up to hold the charcoal in place during the burning and the Side Capture Flanges (3a, 3b) fold in to wrap around the Flip Up End Grates (5a, 5b) and help secure the charcoal in place. With this connection the charcoal is tightly bunched for more efficient burning. This apparatus also makes it much easier for the user to measure the amount of charcoal that they are going to be cooking with so that they burn the appropriate amount.

The basic steps of the method of the invention comprise: Folding one of the Flip Up End Grates (5a) up and over to load the newspaper. Folding the Flip Up End Grate (5a) back down to lock the newspaper into place. Folding both Flip Up End Grates (5a, 5b) and Side Capture Flanges (3a, 3b) up and securing them into position. Loading the charcoal into the apparatus. Starting the newspaper on fire.

The expected outcome of the invention is to make the starting of a charcoal grill much easier and more efficient without the use of charcoal lighter fluid.

The benefits of the invention include, but are not necessarily limited to:

1) The elimination of the hassle and cost of using charcoal lighter fluid during the fire starting process.

2) The elimination of the time spent hand stacking charcoal in order to get the fire to start and then the hassle of redistributing the charcoal after it is burning in order to get the food to cook evenly.

3) The elimination of the nasty taste of charcoal lighter fluid that remains in the food when lighter fluid is used to start the charcoal fire.

4) The ability to measure the necessary amount of charcoal needed to cook the food.

5) Having this unique charcoal fire starting unit as an integral part of the grill itself. Thus eliminating the need for an external fire starting mechanism.

The description above and the accompanying materials should be interpreted in the illustrative and not the limited sense. While the invention has been disclosed in connection with the preferred embodiment or embodiments thereof, it should be understood that there may be other embodiments which fall within the scope of the invention.

The invention claimed is:

1. A cooking grate, comprising:
   a. a charcoal grate base;
   b. at least one flip up end grate connected to the charcoal grate base;
   c. at least one underside flap connected to the at least one flip up end grate;
   d. at least one side capture flange connected to the charcoal grate base; and
   e. at least one pull chain connected to the at least one side capture flange.

* * * * *